United States Patent
Lipkin et al.

(10) Patent No.: US 10,812,322 B2
(45) Date of Patent: Oct. 20, 2020

(54) SYSTEMS AND METHODS FOR REAL TIME STREAMING

(71) Applicant: Walmart Apollo, LLC, Bentonville, AR (US)

(72) Inventors: Bryan Scott Lipkin, Bentonville, AR (US); Biju Nair, Bentonville, AR (US)

(73) Assignee: Walmart Apollo, LLC, Bentonville, AR (US)

(*) Notice: Subject to any disclaimer, the term of this patent is extended or adjusted under 35 U.S.C. 154(b) by 296 days.

(21) Appl. No.: 15/950,410

(22) Filed: Apr. 11, 2018

(65) Prior Publication Data

US 2018/0302268 A1    Oct. 18, 2018

Related U.S. Application Data

(60) Provisional application No. 62/485,110, filed on Apr. 13, 2017.

(51) Int. Cl.
| | |
|---|---|
| *H04L 12/24* | (2006.01) |
| *G06F 21/62* | (2013.01) |
| *H04L 29/08* | (2006.01) |
| *G06F 16/2455* | (2019.01) |
| *G06Q 20/20* | (2012.01) |
| *H04L 29/06* | (2006.01) |

(Continued)

(52) U.S. Cl.
CPC ...... *H04L 41/069* (2013.01); *G06F 16/24568* (2019.01); *G06F 21/6218* (2013.01); *G06Q 20/202* (2013.01); *H04L 67/1008* (2013.01); *G06Q 10/087* (2013.01); *G06Q 20/20* (2013.01); *G06Q 20/34* (2013.01); *G06Q 30/0185* (2013.01); *G06Q 30/0601* (2013.01); *H04L 67/2809* (2013.01); *H04L 67/40* (2013.01)

(58) Field of Classification Search
None
See application file for complete search history.

(56) References Cited

U.S. PATENT DOCUMENTS

| | | |
|---|---|---|
| 8,738,650 B2 | 5/2014 | Bawa et al. |
| 9,363,282 B1 | 6/2016 | Yu et al. |
| (Continued) | | |

OTHER PUBLICATIONS

DataStax Enterprise Analytics—Build intelligent applications, http://www.datastax.com/products/datastaxenterpriseanalytics, 2016.
(Continued)

*Primary Examiner* — Nicholas R Taylor
*Assistant Examiner* — Tania M Pena-Santana
(74) *Attorney, Agent, or Firm* — McCarter & English, LLP

(57) ABSTRACT

Described in detail herein is an event streaming system. A controller disposed at a facility, can receive an event from computing systems disposed at the facility. The event is received by the controller at a time the event occurs. The controller can stream the event including the set of data. A central system can receive the at least one event streamed by the controller. The central system can include a repository cluster, a relational database, and a NoSQL database. The central system can concurrently route the set of data included in the event to the repository cluster, the relational database and the NoSQL database of the event response system to store the set of data in the repository cluster, the relational database and the NoSQL database.

18 Claims, 5 Drawing Sheets

(51) Int. Cl.
    *G06Q 20/34*     (2012.01)
    *G06Q 10/08*     (2012.01)
    *G06Q 30/00*     (2012.01)
    *G06Q 30/06*     (2012.01)

(56) References Cited

U.S. PATENT DOCUMENTS

| | | | |
|---|---|---|---|
| 9,525,606 B1* | 12/2016 | Staggs | H04L 43/028 |
| 2012/0130940 A1* | 5/2012 | Gattani | G06F 16/958 |
| | | | 707/600 |
| 2014/0358982 A1* | 12/2014 | Pareek | H04L 41/0604 |
| | | | 709/201 |
| 2015/0081618 A1* | 3/2015 | Schuster | G06F 16/254 |
| | | | 707/602 |
| 2015/0356094 A1* | 12/2015 | Gorelik | G06F 16/211 |
| | | | 707/748 |
| 2016/0085399 A1* | 3/2016 | Jain | H04L 41/22 |
| | | | 715/738 |
| 2017/0371944 A1* | 12/2017 | Varada | G06F 16/27 |

OTHER PUBLICATIONS

DataMetica's Solution for Real-Time Analytics, http://datametica.com/datameticassolutionforrealtimeanalytics/, last viewed Nov. 14, 2016.

Apache Kafka with Spark Streaming : Real Time Analytics Redefined: Edureka, http://www.edureka.co/blog/webinars/apachekafkawithsparkstreamingrealtimeanalyticsredefined/, last viewed Nov. 14, 2016.

Elumalai, Babu, Real-time in-memory OLTP and Analytics with Apache-Ignite on AWS, https://aws.amazon.com/blogs/bigdata/ realtimeinmemoryoltpandanalyticswithapacheigniteonaws/, May 14, 2016.

\* cited by examiner

SYSTEMS AND METHODS FOR REAL TIME STREAMING

CROSS-REFERENCE TO RELATED PATENT APPLICATIONS

This application claims priority to U.S. Provisional Application No. 62/485,110 filed on Apr. 13, 2017, the content of which is hereby incorporated by reference in its entirety.

BACKGROUND

Numerous events can occur in a large networked environments. The detection of events and transmission of large volumes of data associated with detected events can be prohibitive and can overwhelm the computing resources in the networked environment. Additionally, evaluation of and response to the events can often be delayed due to latencies associated with event detection and streaming and due to the amount of data associated with the events being generated as well as the storage facilities for storing the events and the data associated with the events.

BRIEF DESCRIPTION OF DRAWINGS

The accompanying figures, which are incorporated in and constitute a part of this specification, illustrate one or more embodiments of the present invention and, together with the description, help to explain the present invention. The embodiments are illustrated by way of example and should not be construed to limit the present invention. In the figures.

DETAILED DESCRIPTION

Figure 1:
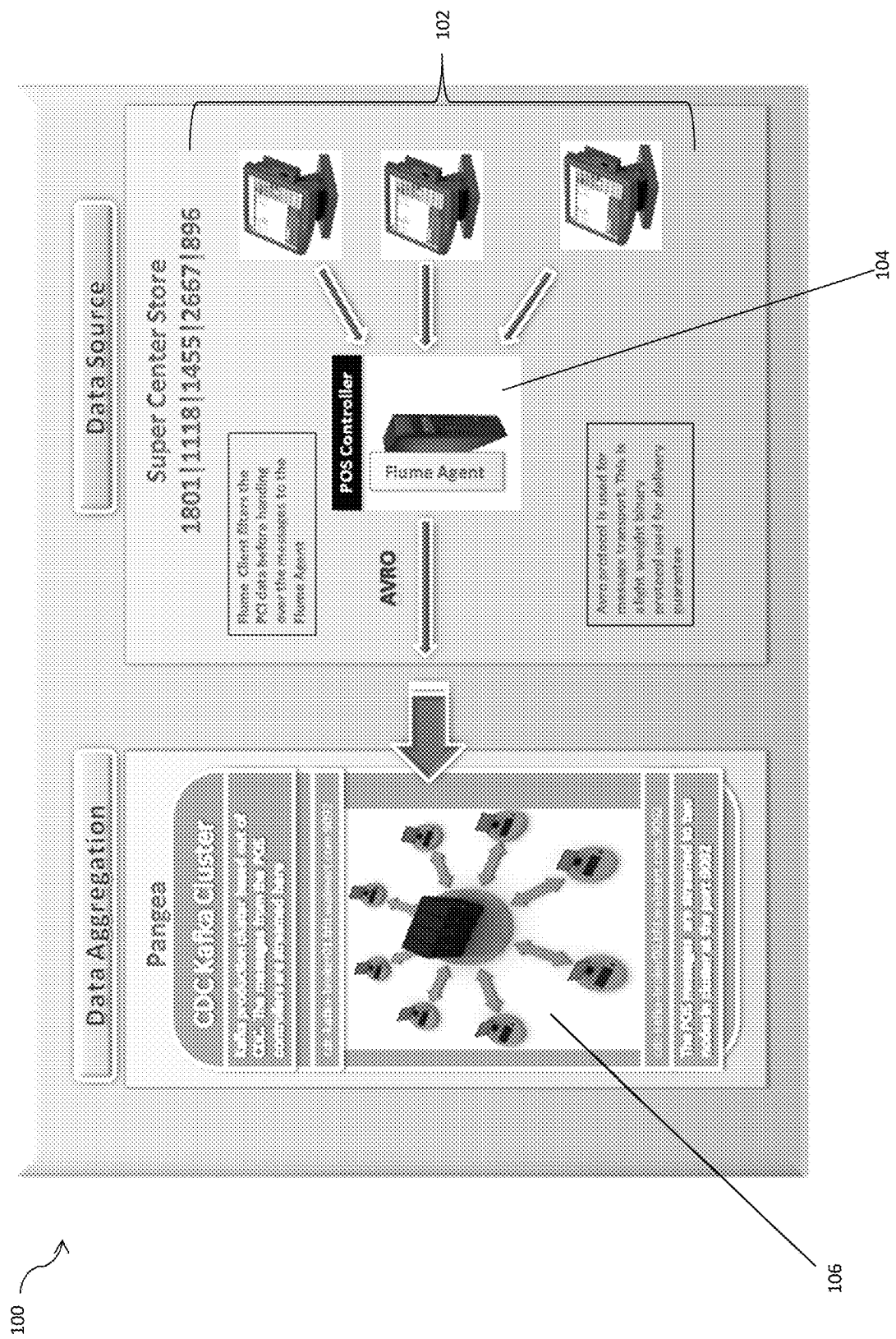
FIG. 1 is a block diagram of a portion of a distributed event streaming system showing event streaming from a controller to a central system in accordance with an exemplary embodiment.

Described in detail herein is a distributed event streaming system. The distributed event streaming system provides an environment for streaming and responding to events in a networked environment and overcomes problems associated with latency in the detecting, streaming, and responding to events generated in a large networked environments. Embodiments of the distributed event streaming system provide a structure/architecture and processes for low latency event detection, event streaming, and event responses that scales with the quantity of events generated by the by components in the network and the quantity of data associated with the generated events.

Embodiments of the distributed event system can include controllers disposed at facilities. The controllers can each receive events from computing systems disposed at their respective facilities. The events can be received by the controllers at a time the event occurs. The events can include a set of data containing sensitive information, and the controllers can remove the sensitive information from the events. The controllers can append the events to sequential event logs maintained by the controllers in response to receiving the event from the computing systems. The sensitive information can be removed from the set of data at the time the controllers append the events to the sequential logs. The controllers can stream the events with the sensitive information removed from the set of data in response to the events being appended to the sequential logs. The events can be streamed via communications network from the controllers to a central computing system.

The central system can have an event receiving system and an event response system. The event receiving system can include a first computing cluster that receives the events streamed by the controllers. The event response system can include separate and distinct master repositories. The master repositories can include a repository cluster, a relational database, and a NoSQL database. The events can be processed by the first computing cluster of the event receiver upon receipt. For example, the first computing cluster can concurrently route the sets of data included in the events to the repository cluster, the relational database and the NoSQL database of the event response system to store the set of data in the repository cluster, the relational database and the NoSQL database. The event response system can receive a request for the sets of data from a system application, and can determine from which of the repository cluster, the relational database, and the NoSQL database to retrieve the data based on a type of the request and a quantity of time that has elapsed since the set of data was stored in the repository cluster, the relational database and the NoSQL database.

The first computing cluster includes event sinks configured to receive streaming sets of data from the controllers, and can include a load balancer configured to route streaming events received from each of the controllers to an appropriate event sink based on a quantity of events and an amount of data being processed by each of the event sinks. The first computing cluster can be operatively coupled to the repository cluster, relational database and NoSQL database via an enterprise service bus.

The repository cluster can include a first master node and a second master node. The first master node can be configured to store the sets of data in persistent storage devices having different data structures and different computing resources associated therewith in response to receipt of the sets of data from the event sink(s). The second master node can be configured to execute actions based on the set of data. The repository cluster can include a first set of slave nodes associated with the first master node and a second set of slave nodes associated with the second master node. The central system can be configured to erase the sets of data stored in the relational database and the NoSQL database after a specified period of time.

FIG. 1 is a block diagram of a portion of a distributed event streaming system showing event streaming from a controller to a central system in accordance with an exemplary embodiment. In exemplary embodiments, event sources 102 can be disposed in facilities. The event sources 102 can be included in computing systems in the facilities. A controller 104 can also be disposed in each facility and can be in communication with the computing systems in each respective facility. The controller 104 can include an agent that processes incoming events. In exemplary embodiments, the agent can be a Flume Agent, which is a (JVM) process that hosts components through which events flow from an external source to a next hop/destination in a networked environment. The controller 104 can maintain and store a sequential event log. The sequential event log can be a transaction log (TLOG) that provides a chronological history of events generated by the computing systems in a facility. The controller 102 can append each event received from the event sources to the end of the sequential log. The sequential log can be purged after a specified period of time and/or in response to storing a specified quantity of data (e.g., in megabyte, gigabytes, terabytes, etc.).

The event sources 102 can generate one or more events in response to operations of the computing systems. The event sources 102 can generate events in response to data/information received or generated, via direct input, such as keyboard, mouse, barcode reader, magnetic strip reader. Alternatively, the event sources 102 can generate events based on the data/information received via wireless transmissions. Each event can include a set of data, and the set of data can include sensitive/confidential information. Once the event is received by the event source 102, the event source can transmit the event (including the set of data and sensitive information) to the controller 104. The controller 104 can receive multiple events from multiple different event sources 102. The controller 104 can remove the sensitive information from each of the sets of data from each received event. Once the controller 104 has removed the sensitive information from the sets of data from each received event, the controller 104 can independently and sequentially transmit (or stream) the events to a central system 106 as the events are processed by the controller 104 and in response to the events being added to the sequential log. For example, the controller 104 can receive several events from several event sources. The controller 104 can process each of the events as the events are received (and in the order in which the events are received) and can add the events to the sequential log to maintain an order of the events. Once an event is added to the sequential log, the controller 104 streams the event to the central system 106. Using this approach, each event is transmitted to the central system 106 independently and separately from each other. In some embodiments, the controller 104 can be configured to process multiple events in parallel. It can be appreciated that the events received at the event source 102 are streamed in real-time to the central system 106 as the events occur. The events can be streamed from the controller 104 to the central system 106 using the AVRO protocol, which is a light weight binary protocol used for delivery guarantee in networked environments. In some embodiments, the events can be streamed to the central system as messages.

The central system 106 can include a computing cluster (e.g., a CDC Kafka Cluster). The computing cluster can include multiple event sinks, configured to receive the events streamed by the controller. The central system 106 can process the sets of data included in the received events, as described herein.

Figure 2:
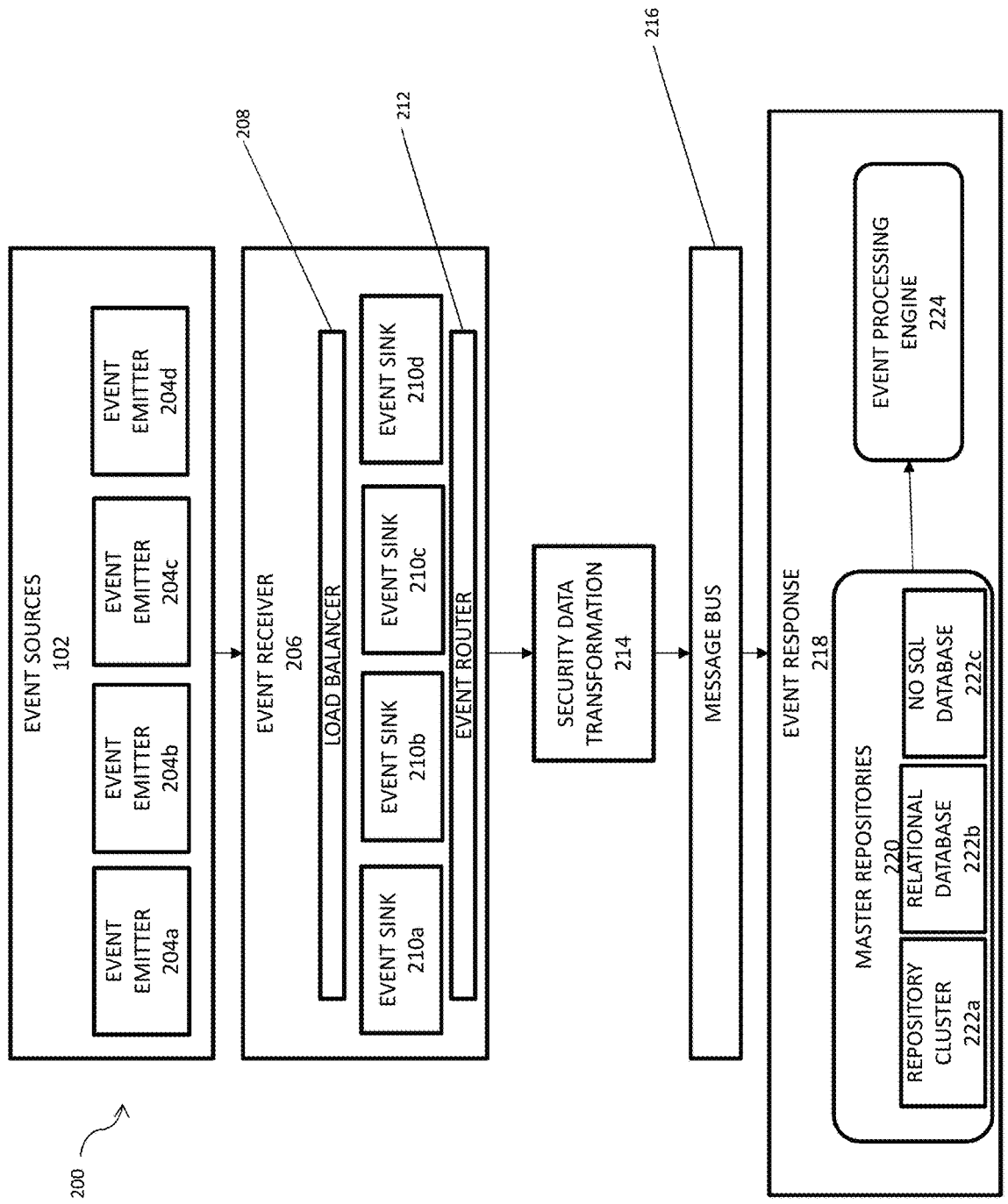
FIG. 2 is a block diagram of a portion of a distributed event streaming system showing events and event responses at the central system in accordance with an exemplary embodiment.

FIG. 2 is a block diagram of a portion of a distributed event streaming system showing events and event responses at the central system in accordance with an exemplary embodiment. Event sources 102 can receive multiple events of different types. The event sources 102 can include event emitters 204a-d. As mentioned above, the event sources 102 can be included in computing systems. Each of the event emitters 204a-d can be configured to receive different types of events. Event emitters may include, for example, hardware and software capable of indicating the occurrence of a particular event. In one embodiment, an event emitter can include a portion of code executed by the controllers (e.g. controllers 102 as shown in FIG. 1) to configure the controllers to receive events as they occur. Alternatively, event emitters can include a portion of code executed by the event sources 102. In an non-limiting example, event emitter 204a can be Flume Event Emitter, event emitter 204b can be a Pangaea Event Emitter, event emitter 204c can be a Miscellaneous Event Emitter and event emitter 204d can be a second Pangaea Event Emitter. It can be appreciated that each even source 102 can include any number of the event emitters 204a-d (e.g. each event source 102 can include each of the event emitters 204a-d, some of the event emitters, one of the event emitters, or more event emitters than the event emitters 204a-d).

The event emitters 204a-d can stream the received events to the central system 106 via a communications network. The central system 106 can include an event receiver 206. The event receiver 206 can include a computing cluster, as described herein, and can include a load balancer 208, event sinks 210a-d, and an event router 212. The load balancer 208 can receive the streamed events from the event emitters 204a-b. The load balancer 208 determine the available capacity of each of the event sinks 210a-d, and can route each of the received events to the event sinks 210a-d based on the available capacity of each of the event sinks 210a-d. Each of the event sinks 210a-d can be embodied as data sinks. The event sinks 210a-d can include classes or functions to receive events from another object or function. Each of the event sinks 210a-d can detect the type of data in the received events and determine the manner in which each event is handled.

In some embodiments, the event sinks 210a-d can determine that an event should be routed to a security data transformation engine 214 based on the detected type of data. The event sinks 210a-d can forward the event to the event router 212 with instructions to route the event to the security data transformation engine 214. The security data transformation engine 214 can receive the event, and can transform binary data in the event to form a structured data file (e.g., such as an XML file using a Binary to XML TLOG converter. The Binary to XML TLOG file can be an application executed on the security data transformation engine 214 to convert binary data in a log file into a structured data file. Subsequently, the security data transformation engine 214 can modify the structured data file to replace sensitive information in the set of data in the event with surrogate data. For example, the security data transformation engine 214 can use a PCI Data Surrogate Replacer. The PCI Data Surrogate Replacer can be an application executed on the security data transformation engine 214 to replace PCI (e.g. sensitive data) with surrogate or replacement data. The security data transformation engine 214 can transmit the event including the modified structured data file to the event router 212, and the event router 212 can route the events to a message bus 216. In some embodiments, the event sinks 210a-d can determine an event should not be routed to the security data transformation engine 214. The event sinks 210a-d can instruct the event router 212 to route the events directly to the message bus 216 (e.g., with routing the events to the security data transformation engine 214).

The message bus 216 can be a high speed Enterprise Bus, and can form a canonicalization layer. The canonicalization layer can be configured to convert received events into a canonical representation of the data. Various functions can be performed with or on the events in the message bus 216. The message bus 216 can include multiple utilities to perform these functions, such as a canonical translate, master-data fast-matcher, zUID Solictor, and security and compliance validator. The canonical translate can transform a set of data in each received event into a canonical representation of data. The transforming of the set of data in each event into a canonical representation of data can include the process of converting the set of data in each received event into a standard format of data compatible with the event response 218. The master data fast-matcher can associate each received event with a stored user account. The zUID Solictor can assign each event a unique identifier (ID). The security and compliance validator can validate the set of data in each received event based on security and compliance checks. Once the utilities of the message bus 216 have performed the appropriate functions to the events, the events can be routed to and stored in one or more master repositories 220 in an event response system 218. The master repositories 220 can include a repository cluster 222a, a relational database 222b and a NOSQL Database 222c. In some embodiments, the master bus 216 can select specified repositories for storage. Alternatively, each of the events can be stored in each of the repositories.

The events stored in the repository cluster 222a can be used by the event response system to provide high-speed data analytics on large quantities of data. The repository cluster 222a can include a first master node, second master node, and slave nodes, where each node includes at least one machine and/or computing device. The first master node can be a Name Node and the second master node can be a Job Tracker. The Name Node can be configured to manage the storage of the data received in the events. The Job Tracker can be configured to manage the parallel processing of the data in the received events. Each of the slave nodes can be either a Data Node or a Task Tracker. The Data Node can be a slave node associated with the Name Node, and can be configured to perform the task of storing the data from the received events. The Task Tracker can be configured to be a slave node associated with the Job Tracker. The Task Tracker can be configured to execute computations using the data in the received events. The Task Tracker can provide the results of the computations back to the Job Tracker. The slave nodes can dynamically allocated resources such that the slave nodes do not have fixed static operations and/or functions. For example, the slave nodes can be interchangeably and dynamically allocated as Data Nodes or Task Trackers based on the availability of the slave nodes. As a non-limiting example, the repository cluster 222a can include a Hadoop cluster.

The relational database 222b can be a persistent database, which can be organized based on a relational model of data. In some embodiments, the relational database 222b can be a SQL database. The relational database 222b can store a large volume of data for long periods of time. As the size of the database increases and the relationship between the data stored in the relational database 222b increases, the relational database can experienced increased latencies associated with the search and retrieval of data from the relational database.

The NoSQL database 222c can be a database configured to store and retrieve data from the received events based on non-relational database models. The data from the received events can be stored NoSQL database 222c. The NoSQL databases 222c can store data for shorter periods of time than the repository cluster 222a and the relational database 222b. For example, the data in the NoSQL databases 222c can be purged after having been stored in the NoSQL databases 222c for a specified period of time or when new data is added. For example, the NoSQL database 222c can implement a last-in first-out protocol in which older data is purged to free computing resources and storage for new data to be added to the NoSQL databases 222c. Using this approach, the NoSQL databases 222c can store the most recent events and data associated therewith. By limiting the quantity of data stored in the NoSQL databases 222c, the latency associated with search and retrieval of the data stored in the noSQL databases 222c can be lower than the latencies associated with the repository clusters 222a and the relational databases 222b.

The types of NoSQL databases 222c that can be implemented by the event response system can include Column, Document, Key-Value, Graph, and Multi-Model. In the Column type of NoSQL databases 222c, the data is stored in a column including a unique name, value and timestamp. The value can be represent the data and the timestamp can be used to validate the content of the value (Le. the data). The Column type of NoSQL databases 222c can also include super columns which can be an associative array of columns and a column family which can contain multiple columns sorted by their name. The column family can be represented by the row key. The Column type of NoSQL databases 222c can also include a super column family, which can contain super columns shorted by their names. The super column family can be represented by a row key.

In the Document type of NoSQL databases 222c document-oriented information can be stored, managed and retrieved. This can also be known as semi-structured data. Document type of NoSQL databases 222c databases can store all information for a given object in a single instance in the database. Every stored object can be different from every other.

In the Key-Value type of NoSQL database 222c the data can be stored in associative arrays. The associative arrays can contain a collection of objects, or records. Each of the collections can have different fields within them. Each of the fields can contain data. The collection of objects or records are stored and retrieved using a key that uniquely identifies the record or object. The key can be used to quickly find the data within the database. The key-value systems store the data as a single collection of records or objects which are unexposed. Each of the collections of which may have different fields for every record.

In the Graph type of NoSQL databases 222c, the data can be stored in graph data structures such as nodes and edges. The relationships between the data structures allow data in the store to be linked together directly. The data can be retrieved with a single operation. The Graph type NoSQL databases 222c are similar to network-model databases.

In the Multi-Model type NoSQL databases 222c the database support different types of NoSQL databases. Document, graph, relational, and key-value models are examples of types that may be supported by a multi-model database.

As a non-limiting example, the current system can implement the Column type database. The NoSql database 222 can store each event identified by a unique name. The events can be also stored as a Column Family. The first, second and third events can be stored in a first, second and third column respectively. The first second and third columns can be stored in one Column Family represented by a row key.

Once the events have been stored in the respective master repositories 220, the master repositories 220 can publish the stored data and/or grant on-demand access to an Application Program Interface (API). Systems with appropriate permissions can access the data, via the API. The API can be configured to translate and verify the appropriate queries for retrieval of the data from the three different databases 222a-c. In some embodiment, the specific repository can be specified in the query. Alternatively, the API can determine the specific repository based on the query.

In response to being stored in the respective repository 222a-c, the events can be transmitted from the master repositories 220 to the event processing engine 224 for event processing. In some embodiments, prior to transmitting the events to the event processing engine 224, the events can be transmitted to a third party system or any other system other than the central system. For example, the event can be transmitted to a fraud detection system to authorize the event. Alternatively, if the event is associated with an action associated with physical object disposed in a facility that is performed by a computing system, the event can be transmitted to a replenishment system and/or inventory control system. The replenishment system and/or inventory control system can assure a correct number of physical objects are delivered to or disposed in the facility. The fraud detection system, replenishment system and/or inventory control system can transmit the events to the event processing engine 224, and the event processing engine 224 can process the received events.

Figure 3:
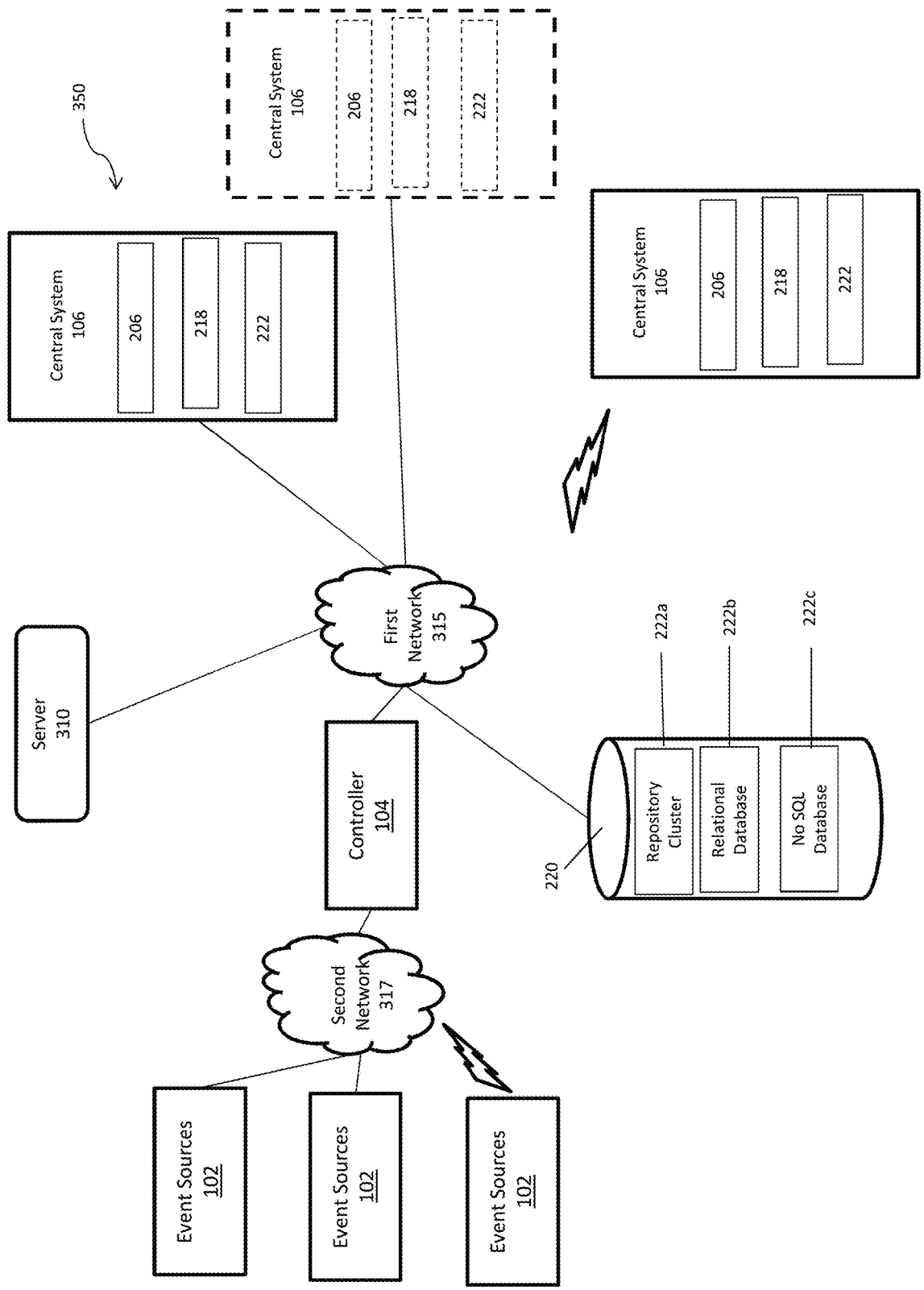
FIG. 3 is a distributed networked computing environment showing an example of the distributed event streaming system according to an exemplary embodiment.

FIG. 3 is a distributed computing environment including an embodiment of the event streaming system 350 according to the present disclosure. The event streaming system 350 can include master repositories 220, one or more of central systems 106, one or more controllers 104 and one or more event sources 102. In one exemplary embodiment, the central system 106 can be in communication with the master repositories 220, one or more of central systems 106, and one or more controllers 104, via a first communications network 315. The controllers 104 can be in communication with the event sources 102 via the second communications network 317. The central system 106 can include an event receiver 206 and event processing engine 222.

In an example embodiment, one or more portions of the first and second communications network 315, 317, can be an ad hoc network, a mesh network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The central system 106 includes one or more computers or processors configured to communicate with the master repositories, servers 310, controllers 104 via the first network 315. The central system 106 hosts one or more applications configured to interact with one or more components of the event streaming system 350. The master repositories 220 can store information/data, as described herein. For example, master repositories 220 can include the repository cluster 222a, the relational database 222b, and the NoSQL database 222c. The repository cluster 222a, relational database 222b, and NoSQL database 222c can store the streamed events and the data in the streamed events. The master repositories 220 and server 310 can be located at one or more geographically distributed locations from each other or from the central system 106. Alternatively, the master repositories 220 can be included within server 310 or central system 106

In exemplary embodiments, event sources 102 can receive multiple events of different types. Each of the events can include a set of data. The event sources 102 can transmit the events received to the controller 104 in real time (i.e., as they are received/generated and at the time they occur). The controller 104 can transmit the received events to the central system 106. The controller 104 can append each received event to a sequential log and transmit the event in response to appending the event to the sequential log. The event receiver 206 on the central system can receive the events. The event receiver 206 can include a load balancer 208, event sinks 210a-d and an event router 212. Each of the event sinks 210a-d can be configured to process large volumes of transactions. Each of the event sinks 210a-d can detect the type of data in the received events and decide how to handle each event. The load balancer 208 can receive the streamed events from the event emitters 204a-b. The load balancer 208 determine the capacity of each of the event sinks 210a-d. The load balancer 208 can route each of the received event based on available capacity of each of the event sinks 210a-d. The event receiver 206 can determine the type of event based on the set of data in the event. The event receiver can forward the events to an event response 218, via a message bus (as illustrated in FIG. 2). The event response 206 can determine where to store each of the received events based on the determined type of event. In some embodiments, the event response 218 can receive instructions from a master bus indicating where to store the events and the data in the events. The event response 218 can store the events the repository cluster 222a, the relational database 222b and/or the NoSQL database 222c based on the type of event. Once the events have been stored, the event processing engine 224 can process the events. For example, the event can be a request for replenishment for a physical object. The event processing engine can transmit a request for replenishment of the physical object to a replenishment system and/or trigger replenishment of the physical object.

As a non-limiting example, the event streaming system 350 can be implemented in a retail and/or an e-commerce environment. The event sources 102 can be associated with Point of Sale (POS) terminals, online store websites or retail store warehouse systems. It can be appreciated the event sources 102 can be any devices associated with the retail store and/or e-commerce system in which events take place. The events can be purchases/returns of products, inquires related to products, product recalls, requests for replenishment of products, changes in product information and other events related to retail stores and/or e-commerce systems.

The event sources 102 can receive the events. The events can include a set of data associated with an action or operation performed by computing device. For example, if the event is associated with a purchase of a product, the set of data can include the product information, from where the product was purchased, the date and time of the purchase, and the payment information, such as payment card information (PCI). The event can be identified by the event source and streamed to the controller from the event source 102 at the time the event is identified. The controller 104 can strip and/or remove the PCI data from the set of information in the event and stream the event to the central system 106. The even receiver 106 can receive the event and determine the type of event based on the set of data in the event.

Continuing with the example of an event associated with a purchase of a product, the event receiver can determine the event type is a purchase of a product. The event receiver 206 can transmit the event to the event response system 222, via the message bus. The event response system 222 can store the event in the repository cluster 222a, the relational database 222b and/or the NoSQL database 222c based on, for example, the type of event. As one example, if the retail store is interested in executing data analytics on large volumes of data and storing the data for longer periods of time, the event response 220 can store the event in the repository cluster 222*a* for the purposes of data analytics and/or store the event in the relational database 222*b* for long term storage. If the retail store is interested in being able to retrieve and respond to events with low latency and in, the event response 220 can store the event in the NoSQL database 222*c*. The repository cluster 222*a*, the relational database 222*b* and/or the NoSQL database 222*c* can have overlapping data sets. For example, Some of the same data can be stored in the repository cluster 222*a*, the relational database 222*b* and/or the NoSQL database 222*c*. The retail store can retrieve the data from the event response system 222 based on the need of the data. Once the event is stored, the event processing engine 224 can commit the event (i.e. commit the purchase of the product). The event response 206 can also forward the event to external systems such as fraud detection for verifying the purchase is legitimate purchase and/or a replenishment/inventory system to ensure the purchase of the product is accounted for in the inventory of the retail store.

Figure 4:
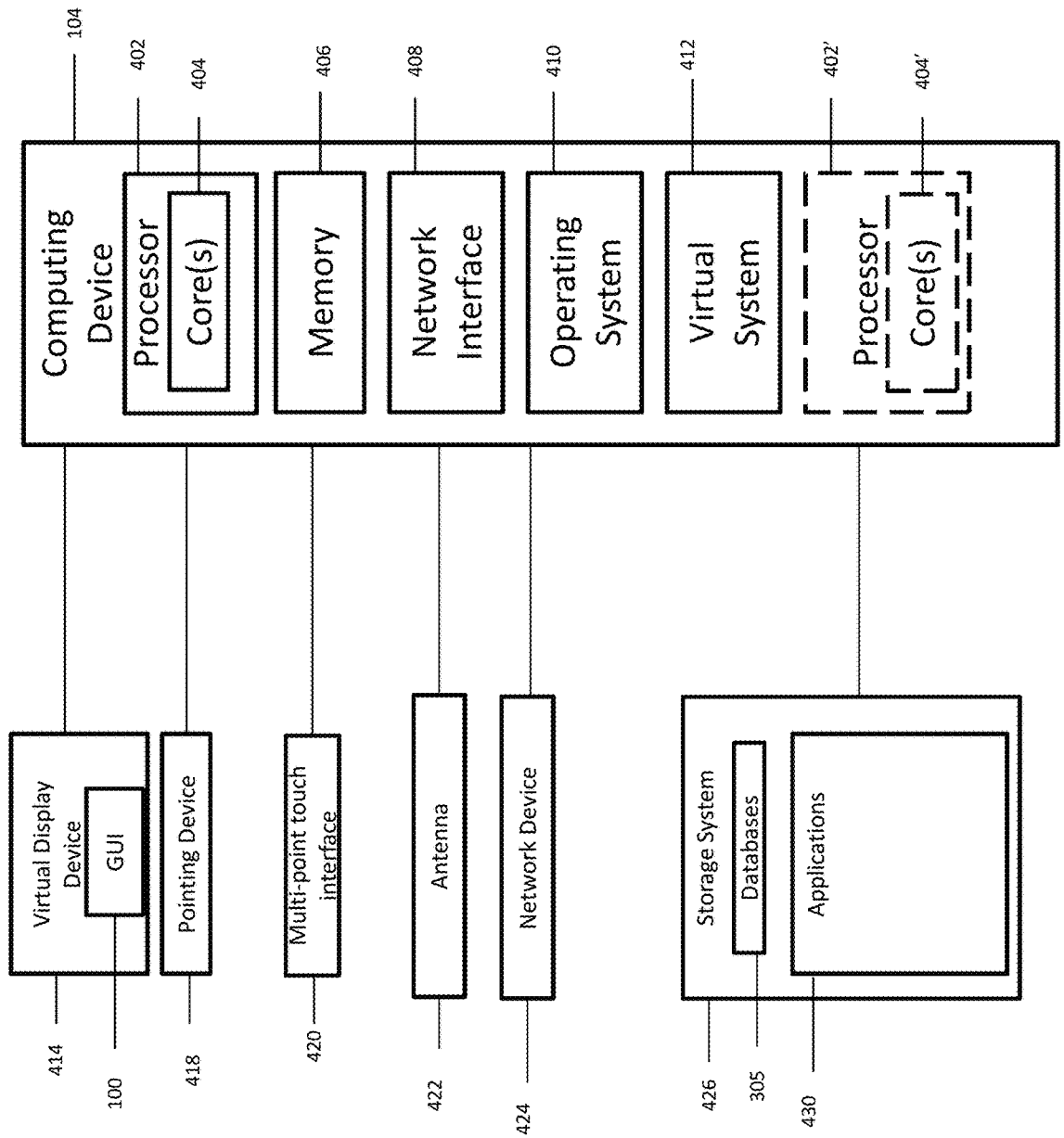
FIG. 4 is a block diagram illustrating an exemplary computing device in accordance with an exemplary embodiment.

FIG. 4 is a block diagram of an example computing device for implementing exemplary embodiments. The computing device 400 can implement embodiments of the event processing system 350. As a non-limiting example, the computing device 400 can as an event source, and/or controller. The computing device 400 can also be included as part of the event receiver, event response and/or central system. In one non-limiting example, the computing device 400 can be embodied as one or more nodes in the repository cluster. The computing device 400 can be a master and/or slave node.

The computing device 400 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 406 included in the computing device 400 may store computer-readable and computer-executable instructions or software (e.g., applications 430) for implementing exemplary operations of the computing device 400. The computing device 400 also includes configurable and/or programmable processor 402 and associated core(s) 404, and optionally, one or more additional configurable and/or programmable processor(s) 402' and associated core(s) 404' (for example, in the case of computer systems having multiple processors/cores), for executing computer-readable and computer-executable instructions or software stored in the memory 406 and other programs for implementing exemplary embodiments. Processor 402 and processor(s) 402' may each be a single core processor or multiple core (404 and 404') processor. Either or both of processor 402 and processor(s) 402' may be configured to execute one or more of the instructions described in connection with computing device 204.

Virtualization may be employed in the computing device 400 so that infrastructure and resources in the computing device 400 may be shared dynamically. A virtual machine 412 may be provided to handle a process running on multiple processors so that the process appears to be using only one computing resource rather than multiple computing resources. Multiple virtual machines may also be used with one processor.

Memory 406 may include a computer system memory or random access memory, such as DRAM, SRAM, EDO RAM, and the like. Memory 406 may include other types of memory as well, or combinations thereof.

A user may interact with the computing device 400 through a visual display device 414, such as a computer monitor, which may display the graphical user interfaces 416. The graphical user interface 416 can be generated by the deployment web-service as discussed above. The computing device can include input/output devices such as multi touch interface 420, a keyboard and a pointing device 418.

The computing device 400 may also include one or more storage devices 426, such as a hard-drive, CD-ROM, or other computer readable media, for storing data and computer-readable instructions and/or software that implement exemplary embodiments (e.g., applications). For example, exemplary storage device 426 can include one or more databases 428 for storing information regarding events. The databases 428 may be updated manually or automatically at any suitable time to add, delete, and/or update one or more data items in the databases.

The computing device 400 can include a network interface 408 configured to interface via one or more network devices 424 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 422 to facilitate wireless communication (e.g., via the network interface) between the computing device 400 and a network and/or between the computing device 400 and other computing devices. The network interface 408 may include a built-in network adapter, network interface card, PCMCIA network card, card bus network adapter, wireless network adapter, USB network adapter, modem or any other device suitable for interfacing the computing device 400 to any type of network capable of communication and performing the operations described herein.

The computing device 400 may run operating system 410, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or other operating systems capable of running on the computing device 400 and performing the operations described herein. In exemplary embodiments, the operating system 410 may be run in native mode or emulated mode. In an exemplary embodiment, the operating system 410 may be run on one or more cloud machine instances.

Figure 5:
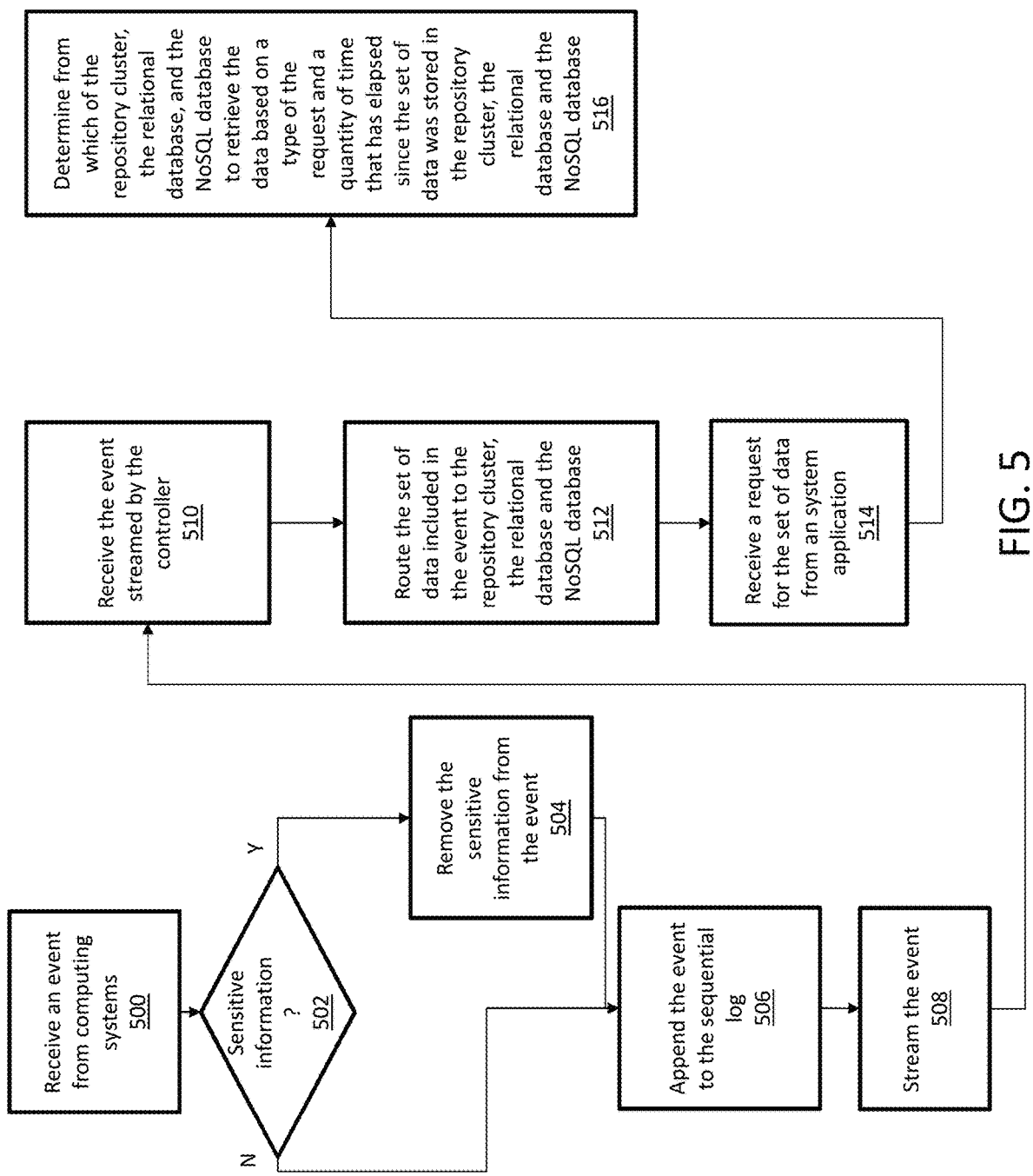
FIG. 5 is a flowchart illustrating an exemplary process performed in an event streaming system according to an exemplary embodiment.

FIG. 5 is a flowchart illustrating an exemplary process performed in an event streaming system according to an exemplary embodiment. In operation 500, a controller (e.g., controller 104 as shown in FIGS. 1 and 3) disposed at a facility, can receive an event from computing systems (e.g., including event sources 102 as shown in FIGS. 1-3) disposed at the facility. The event is received by the controller at a time the event occurs. The event includes a set of data containing sensitive information.

In operation 502, the controller can determine whether the event includes sensitive information from the event. In operation 504, if the event includes sensitive information the controller can remove the sensitive information. For example, the controller can remove the sensitive information and substitute the sensitive information with surrogate information. As a non-limiting example if the event includes the sensitive information "December 2020", the controller can replace the sensitive information with "XX-XXXX."

In operation 506, the controller can append the event to a sequential log maintained by the controller. In operation 508, the controller can stream the event at a time the event is appended to the sequential log. For example, the controller can independently and sequentially stream each of the events as each event is appended to the bottom of the sequential log. The controller can implement a First In First Out (FIFO) for streaming the events on the sequential log.

In operation 510, a central system (e.g. central system 106 as shown in FIGS. 1-3) having an event receiving system (e.g. event receiver 206 as shown in FIGS. 1-3) can receive the event streamed by the controller. The event receiver system including a first computing cluster (e.g. event sinks 210a-d as shown in FIG. 2). The central system also including an event response system (e.g. event response 218 as shown in FIGS. 2-3). The event response system can include master repositories (e.g. master repositories 220 as shown in FIGS. 2-3). The master repositories can include a repository cluster (e.g. repository cluster 222a as shown in FIGS. 2-3), a relational database (e.g. relational database 222b as shown in FIGS. 2-3), and a NoSQL database (e.g. NoSQL database 222c as shown in FIGS. 2-3). The event is processed by the first computing cluster of the event receiver upon receipt.

In operation 512, the first computing cluster can concurrently route the set of data included in the event to the repository cluster, the relational database and/or the NoSQL database of the event response system to store the set of data in the repository cluster, the relational database and the NoSQL database. In operation 514, the event response system can receive a request for the set of data from an system application and/or automatically publish the events for consumption by the system application. In operation 516, the event response system can determine from which of the repository cluster, the relational database, and the NoSQL database to retrieve the data based on a type of the request and a quantity of time that has elapsed since the set of data was stored in the repository cluster, the relational database and the NoSQL database.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present invention. Further still, other aspects, functions and advantages such as different combinations of the described embodiments are also within the scope of the present invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A system for streaming events in a distributed computing environment, the system comprising:
a plurality of computing systems disposed at the facility;
a controller disposed at a facility, the controller being operatively coupled to the plurality of computing systems and including a sequential log, the controller configured to:
receive at least one event from at least one of the plurality of computing systems at a time the event occurs, the at least one event including a set of data containing sensitive information;
remove the sensitive information from the at least one event;
append the at least one event to the sequential log; and
stream the at least one event including the set of data with the sensitive information removed at a time the at least one event is appended to the sequential log;
a central system having an event receiver system including a first computing cluster, and an event response system including a repository cluster, a relational database, and a NoSQL database, the central system configured to:
receive, via the first computing cluster of the event receiver, the at least one event streamed by the controller;
concurrently route, via the first computing cluster, the set of data included in the event to the repository cluster, the relational database and the NoSQL database of the event response system to store the set of data in the repository cluster, the relational database and the NoSQL database;
receive, via the event response system, a request for the set of data from an system application; and
determine from which of the repository cluster, the relational database, and the NoSQL database to retrieve the data based on a type of the request and a quantity of time that has elapsed since the set of data was stored in the repository cluster, the relational database and the NoSQL database.

2. The system of claim 1, wherein the first computing cluster includes a plurality of sinks configured to receive streaming sets of data from the controller.

3. The system of claim 2, wherein the first computing cluster includes a load balancer configured to route streaming events from each of the controller to an appropriate sink of the plurality of sinks based on an amount of data being processed by each of the sinks.

4. The system of claim 2, wherein the first computing cluster is operatively coupled to the repository cluster, relational database and NoSQL database via an enterprise service bus.

5. The system of claim 1, wherein the repository cluster includes a first master node and a second master node.

6. The system of claim 5, wherein the first master node is configured to save the set of data into a persistent storage device.

7. The system of claim 6, wherein the second master node is configured to execute an action based on the set of data.

8. The system of claim 7, wherein the repository cluster includes a first plurality of slave nodes associated with the first master node and a second plurality of slave nodes associated with the second master node.

9. The system of claim 1, wherein the central system is configured to erase the set of data stored in the relational database and the NoSQL database after a specified period of time.

10. A method for streaming events in a distributed computing environment, the method comprising:
receiving, via a controller disposed at a facility, at least one event from at least one of the plurality of computing systems disposed at the facility, the at least one event being received by the controller at a time the event occurs, the at least one event including a set of data containing sensitive information;
removing, via the controller, the sensitive information from the at least one event;
appending, via the controller, the at least one event to the sequential log;
streaming the at least one event including the set of data with the sensitive information removed via the controller at a time the at least one event is appended to the sequential log;
receiving the at least one event streamed by the controller via a central system, the central system having an event receiver system including a first computing cluster, and an event response system including a repository cluster, a relational database, and a NoSQL database, the at least one event being processed by the first computing cluster of the event receiver upon receipt;
concurrently routing, via the first computing cluster of the central system, the set of data included in the event to the repository cluster, the relational database and the NoSQL database of the event response system to store the set of data in the repository cluster, the relational database and the NoSQL database;
receiving, via the event response system of the central system, a request for the set of data from an system application; and
determining, via the event response system, from which of the repository cluster, the relational database, and the NoSQL database to retrieve the data based on a type of the request and a quantity of time that has elapsed since the set of data was stored in the repository cluster, the relational database and the NoSQL database.

11. The method of claim 10, wherein the first computing cluster includes a plurality of sinks configured to receive streaming sets of data from the controller.

12. The method of claim 11, wherein the first computing cluster includes a load balancer configured to route streaming events from the controller to an appropriate sink of the plurality of sinks based on an amount of data being processed by each of the sinks.

13. The method of claim 11, wherein the first computing cluster is operatively coupled to the repository cluster, relational database and NoSQL database via an enterprise service bus.

14. The method of claim 10, wherein the repository cluster includes a first master node and a second master node.

15. The method of claim 14, further comprising saving, via the first master node, the set of data into a persistent storage device.

16. The method of claim 15, further comprising executing, via the second master node, an action based on the set of data.

17. The method of claim 16, wherein the repository cluster includes a first plurality of slave nodes associated with the first master node and a second plurality of slave nodes associated with the second master node.

18. The method of claim 10, further comprising erasing via the central system, the set of data stored in the relational database and the NoSQL database after a specified period of time.

* * * * *